Figure 1:
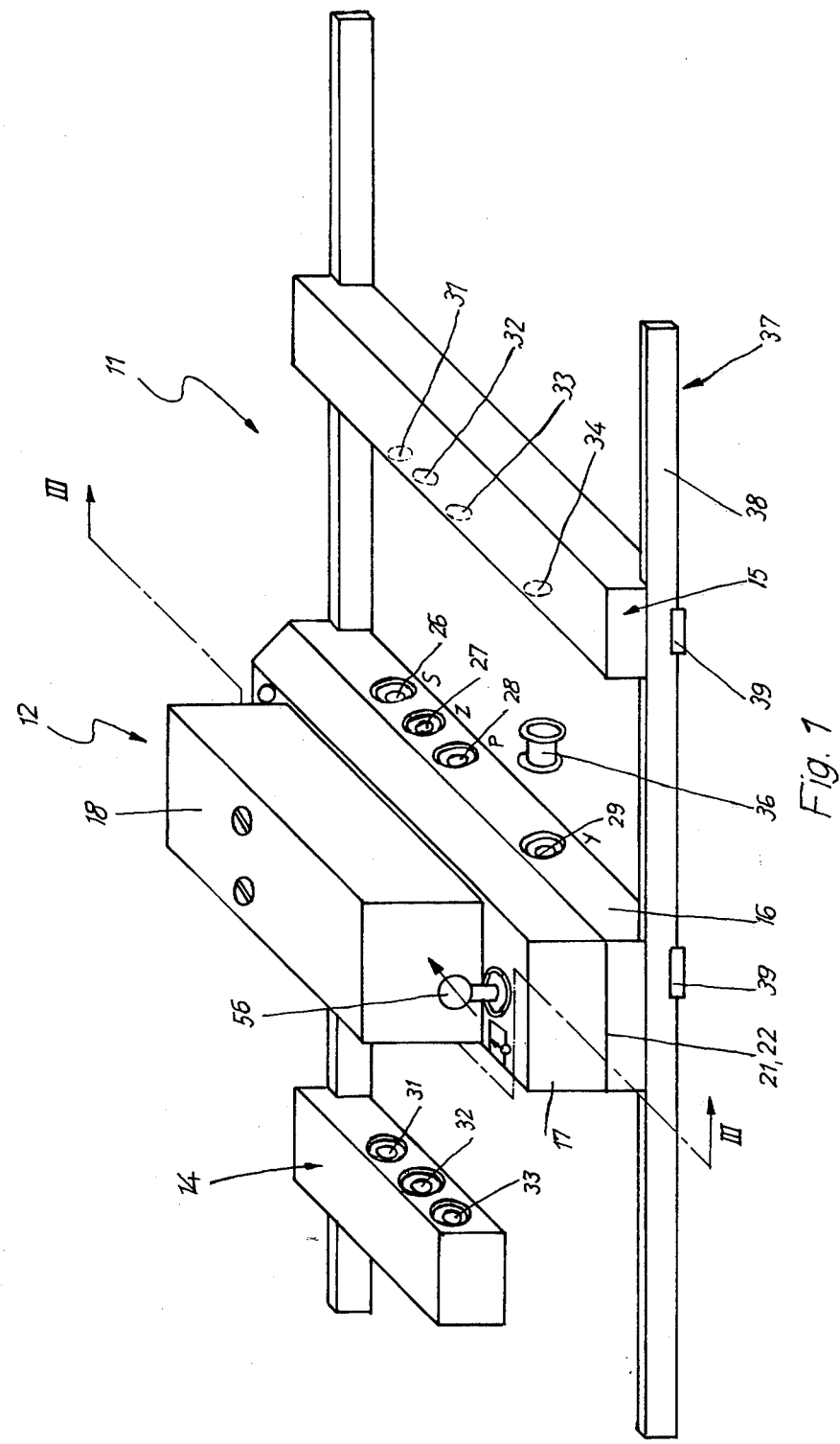

United States Patent [19]

Stoll et al.

[11] 4,181,141

[45] Jan. 1, 1980

[54] PNEUMATIC CIRCUIT ARRANGEMENT

[76] Inventors: Kurt Stoll, Lenzhelde 72, 7300 Esslingen; Manfred Rüdle, Thomasäckerweg 17, 7300 Esslingen-Berkheim, both of Fed. Rep. of Germany

[21] Appl. No.: 874,668

[22] Filed: Feb. 2, 1978

[30] Foreign Application Priority Data

Feb. 5, 1977 [DE] Fed. Rep. of Germany ....... 2704869

[51] Int. Cl.$^2$ .............................................. F15B 13/07
[52] U.S. Cl. .................................... 137/119; 137/269; 137/624.14; 137/884
[58] Field of Search .................... 137/119, 269, 624.14, 137/884

[56] References Cited

U.S. PATENT DOCUMENTS

| 3,234,963 | 2/1966 | Lyon | 137/884 |
| 3,875,959 | 4/1975 | Bouteille | 137/624.14 X |
| 4,112,962 | 8/1978 | Huff | 137/119 |

FOREIGN PATENT DOCUMENTS 2154372 5/1973 France .
121671 8/1976 German Democratic Rep. .

*Primary Examiner*—Gerald A. Michalsky

*Attorney, Agent, or Firm*—Blanchard, Flynn, Thiel, Boutell & Tanis

[57] ABSTRACT

A pneumatic control for cyclic successive activation of a plurality of pressure fluid consumers and comprising a series of control modules abutting each other in side by side relation for controlling activation of respective ones of the consumers. Each control module comprises a logic plate containing an AND gate and an OR gate and supporting a bistable impulse valve. Each control module further includes a connection plate having connecting openings in its front and rear sides for communication between adjacent modules and means for connecting to the associated consumer. An intermediate seal plate interposed between the connection plate and logic plate has channels therethrough connecting the gates and bistable valve on the logic plate with the connecting openings and connecting means in the connection plate in a manner determined by the pattern of such channels in such intermediate seal plate. The end, or last, control module in the series has an intermediate seal plate differing in the arrangement of its connecting channels from the intermediate seal plates of the preceding control modules to assist in starting a new operating cycle of the plurality of control modules and their associated consumers.

3 Claims, 4 Drawing Figures

PNEUMATIC CIRCUIT ARRANGEMENT

The present invention relates to a pneumatic circuit arrangement, in particular in the form of a cyclic control, with logical circuit elements such as pulse stages containing AND gates, OR gates or the like, memories and/or the like.

A circuit arrangement of this kind has been made known in the German Offenlegungsschrift No. 2,149,189. This known circuit arrangement is generally built up separately for a specific function and connected together separately. This is relatively complicated and thus expensive not only in the case of designing a new control arrangement, but also in the case of one or several elements becoming defective in an existing control arrangement.

One object of the present invention is to produce a pneumatic circuit arrangement of the type described at the outset, said arrangement consisting of individual modules which can be easily exchanged and which can be connected together in practically any quantities in order to obtain a specific control.

According to the present invention, this object is solved in that each pulse stage is designed as a module composed of a logic plate in which the logic elements are integrated, a connection plate with supply lines, that enable the logic plates to be connected to each other and to output and input modules provided with external pneumatic connections, and a standard type of impulse valve which has a memory function, and in that one connection plate, one logic plate, and one memory are placed in pressure-tight fashion one above the other in each pulse module.

By integrating the logic elements in the logic plate, it is possible to rapidly exchange without much effort the entire logic plate if defects or some kind of malfunction should occur. Since the separate plates are only placed one on top of the other, it is possible furthermore to effect the exchange without undoing tubing or similar connecting elements. Because the memory and logic plate can be exchanged individually, maintenance of the circuit arrangement according to the present invention is simple and cheap; furthermore, this arrangement can be extended as desired.

In a preferred embodiment of the present invention, a seal is situated between the connection plate and the logic plate in such a manner that it can be replaced and whose recesses determine the internal circuit of the pulse module. In this way it is possible, for example, to obtain two kinds of circuit within the pulse module with one and the same logic plate and the connection plate located beneath it. Exchanging the seal for another is especially advantageous for the pulse module of the last stage if one wishes to ensure that the module of the last pulse stage does not automatically, or alternatively only by applying an additional impulse, reset or prime the first stage of the cyclic control. It is thus in particular possible to provide the pulse module with a repetition inhibit function by simply exchanging the seal.

In another preferred embodiment of the present invention, the connection plates and/or the input and output plates can be joined together by means of connector plugs which can be pressure-tightly plugged into the mutually aligned ends of the supply line sections. Both assembly and replacement of individual parts is thus made considerably simpler, and furthermore this is also a very cheap and distinctive means of connecting the separate supply line sections.

Figure 2:
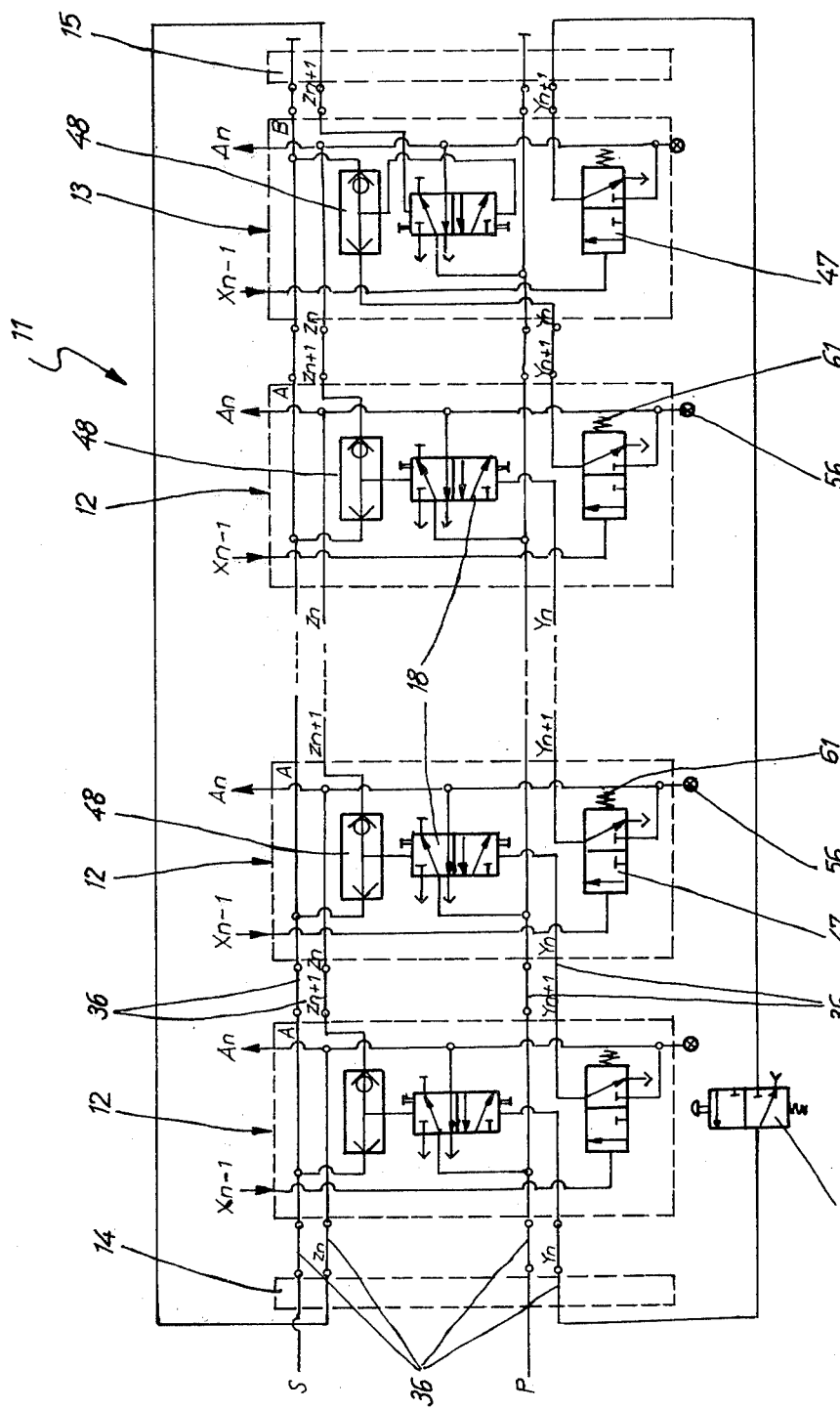
Figure 3:
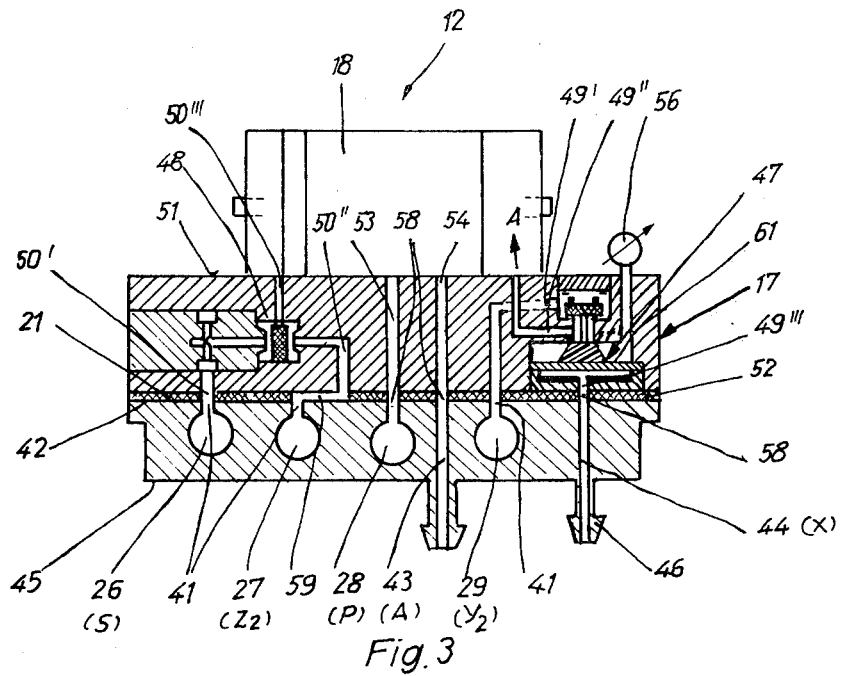
Figure 4:
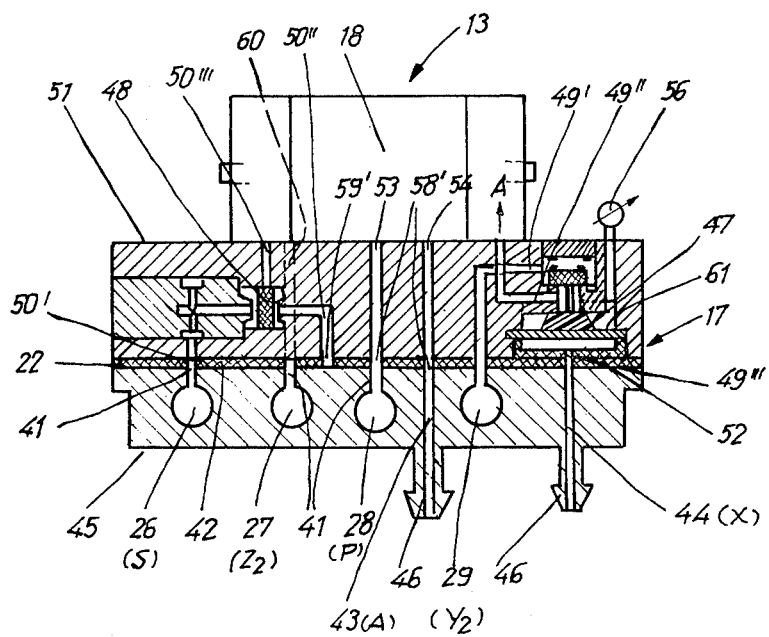

Further details and developments of the present invention will become apparent from the following description in which the present invention is described in more detail and explained with reference to the embodiment shown in the drawing. In the drawing:

FIG. 1 shows a perspective exploded view of the structural development of a circuit arrangement according to one embodiment of the present invention, where apart from the input and output plates only one single pulse stage of the cyclic control is drawn, FIG. 2 shows the circuit diagram of a circuit arrangement provided with several pulse stages in accordance with the embodiment of FIG. 1, FIG. 3 shows a section along line III—III of FIG. 1 through a pulse module of one of the front pulse stages and FIG. 4 shows a section similar to FIG. 3, except it is through the pulse module of the end pulse stage.

The circuit arrangement according to the present invention and shown in the drawing is a pneumatic cyclic control 11 which consists of several pulse stages each of which is constructed as a module 12, and also an end pulse stage constructed as a module 13 and one input and one output module 14 and 15 respectively. A cyclic control 11 of this kind, which can be as long or can be expanded as desired, is used for timed or sequential triggering of various pneumatic operating units, or pressure-medium consumers which are not however described here, in one or several machines or the like and which perform operational steps in specific time sequence. As it will still be shown, the cyclic control 11 is constructed in such a way that a particular operating step can be executed only if the preceding operating step has been completed. In the described embodiment, this operating cycle can however only then be repeated if the last operating step has been completed and if repetition of the operating cycle is desired, and this is accomplished for example by the machine operator starting the new operating cycle by hand.

Each module 12, 13 consists of a connection plate 16, a logic plate 17, and a memory 18, these elements being arranged one above the other or placed on top of each other and pressure-tightly joined together. To produce module 12 for the front pulse stages a seal 21 (or connecting plate of sealing material) is located between the connection plate 16 and the logic plate 17, whereas to produce module 13 for the end pulse stage another seal (or connecting plate of sealing material) 22 is inserted between connection plate 16 and logic plate 17. Seals 21, 22 which, as will still be demonstrated with reference to FIGS. 3 and 4, are provided with different recesses, result in a differing internal linkage between logic plate 17 and connection plate 16.

In this embodiment, the connection plates 16 have four parallel irregularly spaced holes 26 to 29 each of which forms a section of the lines S, Z, P and Y which have yet to be described. Of these holes, the holes 26 and 28 penetrate the entire width of the connection plate 16, whereas the holes 27 and 29 are two blind holes going out from their two sides for the incoming part $Z_1$ and $Y_1$ and the outgoing part $Z_2$ and $Y_2$ of the relevant lines. The input and output modules 14 and 15 are made as plates which are provided with blind holes 31 to 34 which emanate from that longitudinal side which faces the holes 26 to 29 of the connection plates 16. The blind holes 31 to 34 join into holes travelling vertically downwards and not shown in the drawings, said holes being in line with connecting nipples for joining to external lines. Symmetrically shaped, hollow cylindrical connector plugs 36 are pressure-tightly inserted into the holes 26 to 29 and 31 to 34 of the input, and output and connection plates 14, 15, 16 such that the lines S, P and the line sections $Z_1$, $Z_2$ and $Y_1$, $Y_2$ are formed by the holes.

Furthermore, the input, output and connection plates 14, 15, 16 are so constructed that they can be attached to a mounting frame 37 which consists of two parallel longitudinal and several transverse frame members 38, 39. The length of the longitudinal frame members 38 depends here on the number of pulse stages 12, 13 which are to be used.

As can be seen from FIGS. 3 and 4, which show a section in the region of the outgoing line parts $Z_2$ and $Y_2$, the throughholes 26 and 28 and the blind holes 27 and 29 are each joined with one of the holes 41 in a specific plane vertical to them, said holes emanating from the top side 42 of the connection plate 16 which is adjoined by seal 21 or 22 and logic plate 17. Furthermore, the connection plate 16 has another two throughholes 43, 44 which are parallel to the holes 41 and pass through connection nipples 46 on the underside and thus form part of an operating line A and an acknowledgement signal line X.

The logic plate 17 has two pneumatic valves as integrated components, the one being constructed as an AND gate 47 and the other as an OR gate 48. Channels 49 and channels 50 are provided in the logic plate 17, and these are assigned to the AND gate 47 and to the OR gate 48 and extend to the upper side 51 or to the underside 52 of the logic plate 17 depending on which function the channels 53, 54 have to fulfill. In addition, the logic plate 17 has two parallel channels passing through from the underside 52 to the upper side 51, of which the described channels 53, 54 join the pressure line P in the connection plate 16 with one input of the memory 18, or the operating line A in the connection plate 16 with one output of the memory 18, through seal 21 or 22 respectively. The memory 18 is a standard type of air impulse valve which, in this embodiment, has five inputs and can assume two switching positions. The memory valve 18 which is attached to the upper side 51 of the logic plate 17 is provided with connecting holes or channels which are not described here and which are connected to the corresponding channels in logic plate 17. All connections between memory valve 18 and logic elements 47, 48 are shown fully in FIG. 2.

As can be seen from FIG. 3, in the module 12 seal 21 is provided with holes and slots 58, 59 in such a way that the reset line S is connected to the pressure line 50' and the outgoing section $Z_2$ of logic connection line Z is connected to the other pressure line 50" of the OR gate 48. The output 50''' of the OR gate 48 leads to one control input of the memory valve 18. Channel 53 of the pressure line P leads to a memory valve input and channel 54 of the operating line A leads to a memory valve output, and in one switching position of the memory valve 18 such input and output are connected together. The section $Y_2$ of the logic connection line Y leading to the next stage, in other words the outgoing section, is connected to the channel 49' which leads to an output of the AND gate 47, while its input leads through a channel 49" in a way which is not described, or within the valve 18, to the operating position A. Here too, input and output are connected together in one switching position of the AND gate 47. One control input of the AND gate 47 leads through channel 49''' to the acknowledgement signal line X, whereas the reset input is formed by a spring 61 in which position the logic connection line section $Y_2$ is separated from the operating line A. The sections $Z_1$, $Y_1$ of the logic connection lines Z and Y respectively coming from the preceding pulse stage 12 are connected to the operating line A through a curved slot in the seal 21 or they are connected to the memory valve 18 through a seal hole and a throughhole in the logic plate 12.

In module 13 for the end pulse stage, as shown in FIG. 4, only the seal has been exchanged when compared with module 12 in FIG. 3. Seal 22 is provided with holes and slots 58', 59' in such a manner that the incoming section $Y_1$ of logic connection line Y is connected with one input and the reset line S is connected with the other input of the OR gate 48 whose output also leads to the memory valve 18 in a manner which is not described here, although to the other control input as shown in FIG. 2. Furthermore, the outgoing section $Z_2$ of the logic connection line is connected to the one control input of the memory valve 18 through a throughhole 60 shown by dotted lines. With respect to the pressure line P, the acknowledgement signal line X, the operating line A, the outgoing section $Y_2$ and the incoming section $Z_1$ of the respective linkage connection line, seal 22 is constructed in the same fashion as in FIG. 3, i.e. like the seal 21.

As can be seen in FIGS. 2 and 3, the operating line A leads through the AND gate 47 to the upper side 51 of the logic plate 17 to the aperture of which a pressure indicating device 56 is provided. With this pressure gauge 56, one can monitor to ensure that the pressure exists or has built up in each pulse stage 12, 13 and in the proper sequence. The air impulse valve 18 has furthermore a manual control which is not described here, and this allows the status of the memory 18 to be determined.

Essentially, the cyclic control 11 according to the present invention functions as follows: The memory valve 18 is set through the logic connection line Y whenever the AND gate 47 of the preceding pulse stage delivers an output signal. This setting signal at memory 18 of one pulse stage 12 first initiates the control signal in the operating line A through the operating unit concerned for the next pulse stage 12, secondly resets the memory 18 of the one pulse stage 12 through the associated OR gate 48, thirdly enables the AND gate 47 of said next pulse stage 12 or 13, and fourthly visually indicates the operating signal on the pressure gauge 56. If completion of this first switching step, or execution of the stroke or similar of the operating unit concerned is acknowledged by a signal occurring in the acknowledgement line X, then the AND gate 47 of said next pulse stage 12 receives its second input signal after the operating signal A, i.e. in this case it receives its control signal X, and thus the AND gate 47 is switched and a signal is produced in the outgoing logic connection line $Y_2$. This pulse which passes through from pulse stage to pulse stage and which can be dependent on the speed or a similar variable of the operating unit concerned passes on up to the end pulse stage 13. As already mentioned, this end pulse stage 13 is triggered in such a manner that the cyclic control 11 repeats its operating cycle only if the operator actuates a pushbutton 57 which is connected in the external return line of the logic connection line Y from the end pulse stage 13 to the first pulse stage 12. Cancellation of the final pulse stage 13 is then effected differently as compared with the first pulse stages, that is only through the reset line S with which at the same time all other pulse stages are also cancelled. Resetting of the memory 18 of the end pulse stage 13 is effected through the logic connection line Z coming from the input stage 12.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. A fluidic control for the cyclic successive actuation of a plurality of pressure-medium consumers, said fluidic control including control modules which are carried by a frame, each control module being associated with a said consumer, said control modules being constructed similarly, said control modules abutting one another at their opposed sides, such that a given module has a rear side abutting the front side of the preceding module and a front side abutting the rear side of the next following module, said control modules containing an AND gate and an OR gate and a bistable impulse valve;

the AND gate of a given control module having input means for receiving an operating signal produced by said given control module for its associated consumer and also for receiving an acknowledgment signal which indicates the end of the operation of its said associated consumer, the AND gate having output means connected with a first connecting opening in the front side of its control module;

the OR gate having first input means connected to a reset channel which runs through its control module from one side to the other side, the OR gate having second input means connected to a second connecting opening in said front side of its control module, said OR gate having output means connected to the reset input of the bistable impulse valve of said given control module;

the set input of the bistable impulse valve being connected to a first connecting opening in the rear side of the given control module, the output of the bistable impulse valve producing said operating signal and being connected to a second connecting opening in the rear side of the given control module, the first and second connecting openings in the front side of a said control module being aligned with the first and second connecting openings of the rear side of the opposed control module;

a start valve pretensioned into its off position and connected into a feedback line from the output means of the AND gate of the last control module to the set input of the bistable impulse valve of the first control module, and comprising the improvement wherein:

the control modules each include a connection plate, said connecting openings being in the front and rear sides of said connection plate, said connection plate carrying connecting means for connecting to the associated consumer and connecting means for receiving said acknowledgment signal;

a logic plate which contains said AND gate and said OR gate; and an intermediate plate which lies between said connection plate and logic plate and has connecting channels therethrough connecting said connection plate and logic plate, said intermediate plate of the last control module having modified connecting channels therethrough, one of said modified connecting channels connecting said first connecting opening in said rear side to the one input means of said OR gate of the last control module, the other input means of the last mentioned OR gate being connected to said reset channel, the output of said last OR gate being connected to the set input of the bistable impulse valve of the last control module, a further one of said modified connecting channels connecting the reset input of the bistable impulse valve of the last control module to the second connecting opening in said front side of the last control module, the latter front side abutting an output module.

2. A control according to claim 1, in which the intermediate plates are of sealing material.

3. A control according to claim 1, in which said logic plate and connection plate are identical for all of said control modules, said intermediate plates being interchangeable between control modules to change the function thereof.

* * * * *